United States Patent
Gorman et al.

(10) Patent No.: US 7,587,818 B2
(45) Date of Patent: Sep. 15, 2009

(54) REPAIR OF GAS TURBINE BLADE TIP WITHOUT RECOATING THE REPAIRED BLADE TIP

(75) Inventors: Mark Daniel Gorman, West Chester, OH (US); Warren Davis Grossklaus, Jr., West Chester, OH (US)

(73) Assignee: General Electric Company, Schenectady, NY (US)

( * ) Notice: Subject to any disclaimer, the term of this patent is extended or adjusted under 35 U.S.C. 154(b) by 742 days.

(21) Appl. No.: 11/022,185

(22) Filed: Dec. 23, 2004

(65) Prior Publication Data

US 2006/0137179 A1 Jun. 29, 2006

(51) Int. Cl.
- B23P 6/00 (2006.01)
- B63H 1/26 (2006.01)
- C21D 1/00 (2006.01)
- C21D 1/09 (2006.01)
- F04D 29/44 (2006.01)

(52) U.S. Cl. ............... 29/889.1; 29/402.09; 29/402.11; 148/525; 148/565; 415/200; 416/223 R; 416/229 R

(58) Field of Classification Search ............... 29/889.1, 29/402.08, 402.09, 402.11; 416/223 R, 229 R; 415/200; 148/525, 565
See application file for complete search history.

(56) References Cited

U.S. PATENT DOCUMENTS

| | | | |
|---|---|---|---|
| 5,173,255 A | 12/1992 | Ross et al. | |
| 5,794,338 A | 8/1998 | Bowden, Jr. et al. | |
| 5,822,852 A | 10/1998 | Bewlay et al. | |
| 5,897,801 A * | 4/1999 | Smashey et al. | .... 219/137 WM |
| 5,972,424 A | 10/1999 | Draghi et al. | |
| 6,074,602 A * | 6/2000 | Wukusick et al. | ........... 420/443 |
| 6,334,907 B1 | 1/2002 | Das et al. | |
| 6,354,799 B1 | 3/2002 | Mukira et al. | |
| 6,468,367 B1 | 10/2002 | Mukira et al. | |
| 6,595,749 B2 * | 7/2003 | Lee et al. | .................. 416/97 R |
| 6,596,963 B2 | 7/2003 | Kelly | |
| 6,607,611 B1 | 8/2003 | Darolia | |
| 6,609,894 B2 * | 8/2003 | Jackson et al. | .............. 416/224 |
| 2003/0041436 A1 | 3/2003 | Kelly et al. | |
| 2003/0194323 A1 | 10/2003 | Fernihough et al. | |
| 2006/0067830 A1* | 3/2006 | Guo et al. | ............... 416/229 R |

* cited by examiner

*Primary Examiner*—David P Bryant
*Assistant Examiner*—Alexander P Taousakis
(74) *Attorney, Agent, or Firm*—McNees Wallace & Nurick, LLC

(57) ABSTRACT

A damaged gas turbine blade which has previously been in service, and which is made of a base metal, is furnished. Any damaged material is removed from the damaged blade tip. The damaged blade tip is weld repaired with a nickel-base superalloy that is more resistant to oxidation resistance than is the base metal in the operating environment of the tip-repaired gas turbine blade. The method does not include any step of coating a lateral surface of the repaired blade tip with a non-ceramic coating after the step of weld repairing.

9 Claims, 3 Drawing Sheets

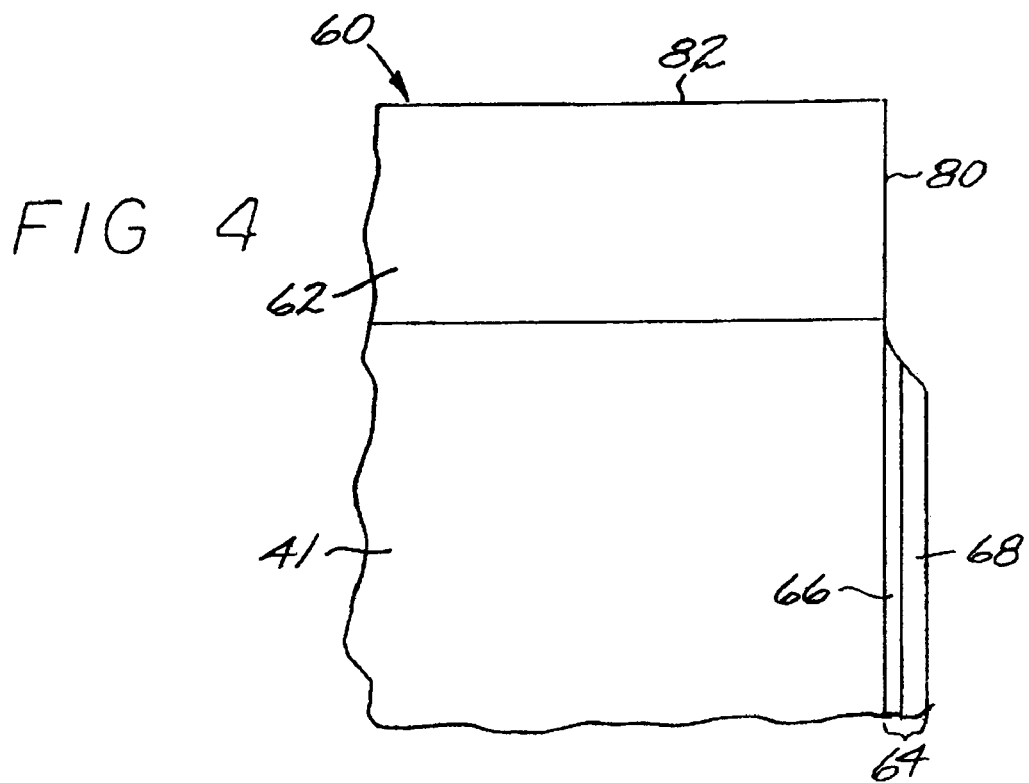
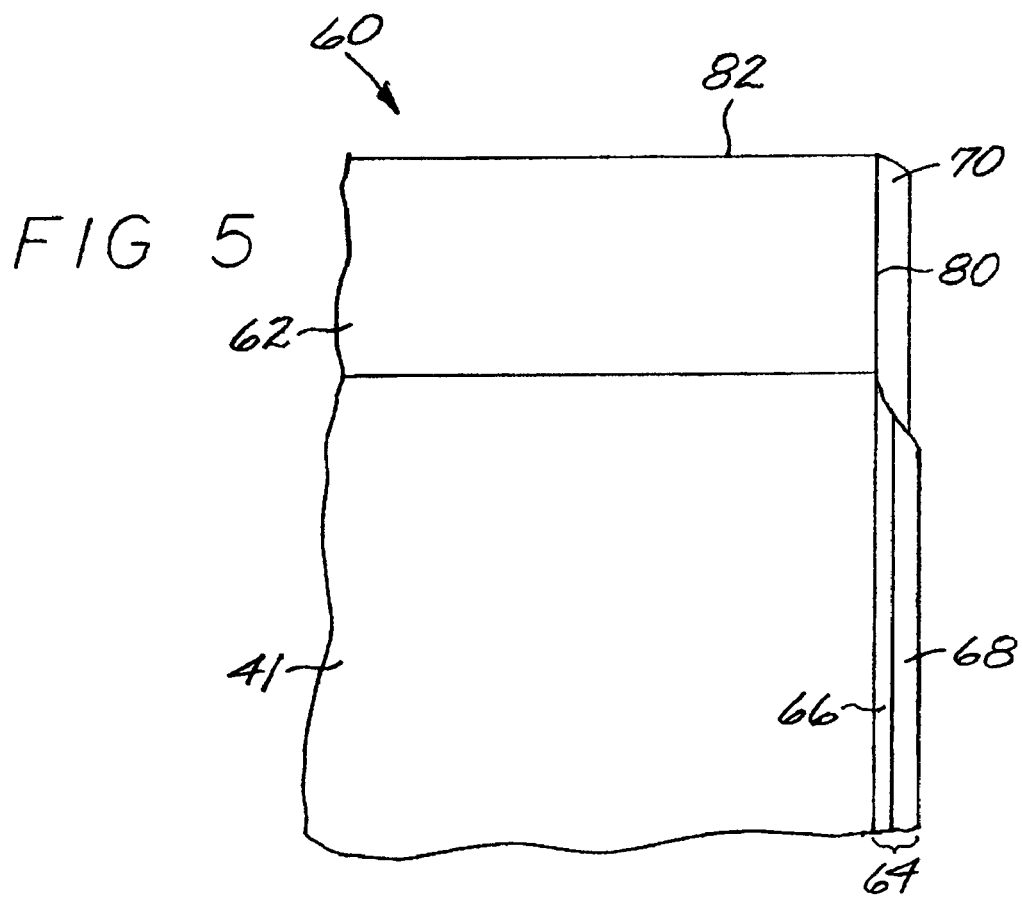

REPAIR OF GAS TURBINE BLADE TIP WITHOUT RECOATING THE REPAIRED BLADE TIP

This invention relates to the repair of the damaged blade tip of a damaged gas turbine blade and, more particularly, to such a repair wherein the repaired blade tip is not recoated with a non-ceramic environmental coating or bond coat.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gases are passed through a turbine mounted on the same shaft. The turbine includes a rotor body with a series of turbine blades extending radially outwardly from the rotor body, and a stationary shroud that forms a tunnel in which the rotor body and its blades turn. The flow of combustion gas turns the turbine by contacting an airfoil portion of the turbine blade, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

The turbine blades are currently made of nickel-base superalloys that have acceptable mechanical properties in the operating conditions of the gas turbine engine. Those nickel-base superalloys are usually coated with a protective coating that protects against oxidation damage. The protective coating includes a non-ceramic coating on the lateral surface of the airfoil. The protective coating may also include a ceramic layer that overlies the non-ceramic coating and insulates the turbine blade to allow it to function for longer times at higher temperatures than would otherwise be possible.

During service and despite the presence of the coating, the tips of some of the turbine blades may be damaged by rubbing contact with the stationary shroud of the gas turbine, by oxidation by the hot combustion gases, and by particle impacts. If the damage becomes sufficiently severe to a turbine-blade tip so that the dimensions of the turbine blade are reduced to less than the specified minimum values and/or the overall engine performance becomes unacceptable, the damaged turbine blade is removed from service. The damaged turbine blade may then be repaired and returned to service or discarded, but repair is preferred because of the high cost of each new turbine blade. The decision to repair or discard is in part economic, so that the higher the cost of the repair, the less likely that the turbine blade will be repaired and the more likely that an expensive new turbine blade will be installed.

In the conventional repair process as now practiced, adjacent protective coatings are removed, the damaged material at the tip is removed, repair material is applied to restore the dimensions of the turbine blade to the specified range, the lateral surface of the tip area is recoated, and the repaired-and-recoated turbine blade is heat treated. To improve overall gas-turbine-engine economics, there is a need to reduce the cost of the repair. The present invention fulfills this need, and further provides related advantages.

SUMMARY OF THE INVENTION

The present approach provides a method for repairing a gas turbine blade having a damaged blade tip region, and a repaired turbine blade. The present approach reduces the cost of the repair, by reducing the need for recoating of the repaired blade tip region.

A method for repairing a damaged gas turbine blade includes furnishing the damaged gas turbine blade which has previously been in service and which is made of a base metal. Any damaged material is removed from the damaged blade tip of the gas turbine blade. The damaged blade tip is weld repaired with a nickel-base superalloy repair alloy that is different from the base metal and is more resistant to oxidation than is the base metal in the operating environment of the gas turbine blade, to form a tip-repaired gas turbine blade having a repaired blade tip. The method does not include any step of coating a lateral surface of the repaired blade tip with a non-ceramic protective coating after the step of weld repairing. The method preferably does not include any step of coating the lateral surface of the repaired blade tip with a ceramic coating after the step of weld repairing, but optionally a ceramic coating may be applied.

The method optionally includes an additional step, after the step of weld repairing, of heat treating the tip-repaired gas turbine blade. If the heat treatment is performed, the tip-repaired gas turbine blade is preferably heat treated at a temperature of from about 1850° F. to about 2050° F. and for a time of from about 1 hour to about 8 hours, followed by an additional ageing heat treatment at a temperature of from about 1500° F. to about 1700° F. and for a time of from about 2 hours to about 16 hours. If a ceramic thermal barrier coating is applied, this same heat treatment may optionally be employed after the deposition of the ceramic coating.

A most preferred nickel-base superalloy used as the repair alloy to weld repair the damaged blade tip has a nominal composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and minor elements. Even more preferably, the nickel-base superalloy used to weld repair the damaged blade tip has a nominal composition in weight percent of about 0.01-0.03 percent carbon, 0.1 percent maximum manganese, about 0.5-0.6 percent silicon, 0.01 percent maximum phosphorus, 0.004 percent maximum sulfur, about 7.4-7.8 percent chromium, about 2.9-3.3 percent cobalt, 0.10 percent maximum molybdenum, about 3.7-4.0 percent tungsten, about 5.3-5.6 percent tantalum, 0.02 percent maximum titanium, about 7.6-8.0 percent aluminum, about 1.5-1.8 percent rhenium, 0.005 percent maximum selenium, 0.3 percent maximum platinum, 0.01-0.02 percent boron, 0.03 percent maximum zirconium, about 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements total 0.5 percent maximum.

The repair alloy preferably has an oxidation resistance equal to or better than these specific repair alloys of the preceding paragraph. The repair alloy may be a variation of one disclosed herein, such as one containing from about 1 to about 1.5 weight percent rhenium or from about 0.2 to about 0.6 weight percent hafnium. The repair alloy may instead be a completely different nickel-base superalloy.

The repaired gas turbine blade comprises a body including an airfoil made of a base metal, and a blade tip of the airfoil made of a nickel-base superalloy repair alloy of a different composition than the base metal. The repair alloy of the repaired blade tip is more resistant to oxidation than is the base metal in the operating environment of the gas turbine blade. There is preferably no non-ceramic coating on the lateral surface of the repaired blade tip.

In conventional practice, the recoating of the lateral surface of the tip of the turbine blade after the repair of the blade tip is exacting and involves several expensive and time-consuming steps. In the usual case where the coating includes a simple, non-ceramic aluminide environmental or bond coat, an aluminum-rich layer is deposited onto the base metal of the repaired area of the lateral surface of the turbine blade by a relatively slow process. The aluminum-rich layer is interdiffused into the base metal with an extended heat treatment. If the coating is a more complex aluminide such as a platinum aluminide, further processing is required to deposit and heat-treat diffuse a platinum layer prior to the deposition and heat-treat diffusion of the aluminum layer.

The present approach avoids the need to perform the several steps of the recoating process for the non-ceramic coating. The cost and processing time of the repair are thereby significantly reduced, making the repair a more attractive option in the decision whether to repair the damaged turbine blade or to install an expensive new-make turbine blade. The performance of the turbine blade repaired according to the present approach is acceptable, both for mechanical properties and for environmental resistance.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is an enlarged schematic sectional view through the turbine blade of FIG. 3, taken on line 4-4, of a first embodiment of the tip-repaired gas turbine blade; and FIG. 5 is an enlarged schematic sectional view like that of FIG. 4, of a second embodiment of the tip-repaired gas turbine blade.

DETAILED DESCRIPTION OF THE INVENTION

Figure 1:
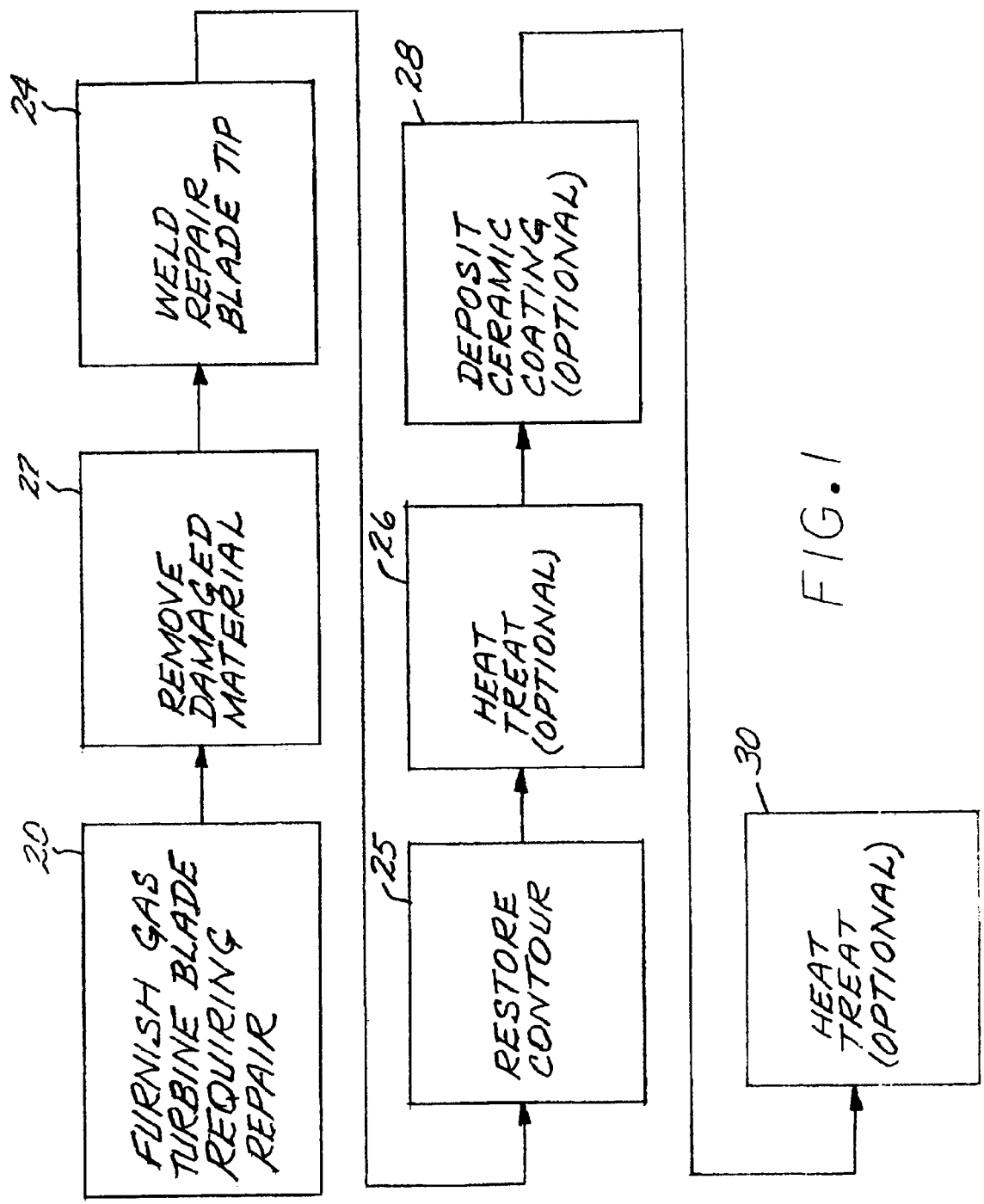
FIG. 1 a block diagram of a method for repairing a turbine blade.
Figure 2:
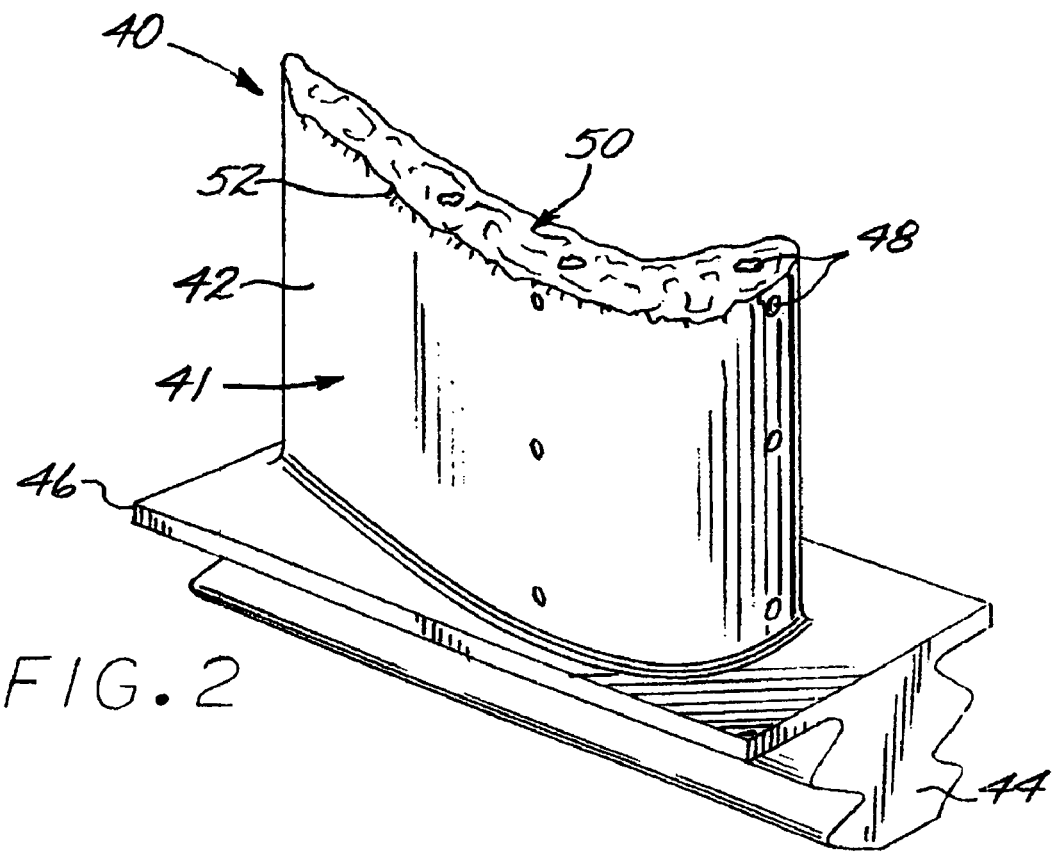
FIG. 2 is a perspective view of a damaged gas turbine blade.

FIG. 1 depicts the steps in a method for repairing a damaged gas turbine blade 40 which has previously been in service, and which is illustrated in FIG. 2. The damaged gas turbine blade 40 requiring repair is furnished, step 20. The damaged gas turbine blade 40 has a body 41 that is made of a base metal. The base metal is preferably a nickel-base superalloy. A nickel-base alloy has more nickel than any other element. A nickel-base superalloy is strengthened by the precipitation of gamma prime and/or a related phase. An example of an operable nickel-base superalloy is Rene™ N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel. The body 41 of the gas turbine blade 40 may be single crystal, directionally oriented polycrystal, or randomly oriented polycrystal.

The damaged turbine blade 40 includes an airfoil 42 against which the flow of hot combustion gas is directed in service. During service, the damaged turbine blade 20 was mounted to a turbine disk (not shown) by a dovetail 44 which extends downwardly from the airfoil 42 and engages a slot on the turbine disk. A platform 46 extends longitudinally outwardly from the area where the airfoil 42 is joined to the dovetail 44. Optionally, a number of internal passages extend through the interior of the airfoil 42, ending in openings 48 in the surface of the airfoil 42. During service, a flow of cooling air is directed through the internal passages to reduce the temperature of the airfoil 42.

The airfoil 42 of the damaged turbine blade 40 ends in a damaged blade tip 50 remote from the dovetail 44. The damaged blade tip 50 of the damaged turbine blade 40 of FIG. 2 has been damaged by material removal, oxidation, and/or corrosion during service. There may also be radial cracks extending from the surface of the damaged blade tip 50 down toward the remainder of the airfoil 42. Material that has been removed is not shown, but damaged material 52 still in place is indicated.

Returning to FIG. 1, the damaged material 52 is thereafter removed by any operable technique, step 22. Damaged material 52 includes cracked, uneven, or oxidized base metal, and any remnants of pre-existing coatings, such as environmental coatings, bond coats, and ceramic thermal barrier coatings, in the vicinity of the damaged material 52. Such damaged material would interfere with the repair performed subsequently, if allowed to remain in place. Examples of operable removal techniques include electro-discharge machining, milling, grinding, hand benching, and etching.

The remaining damaged blade tip 50 is thereafter weld repaired, step 24. In the weld repair, new metal of a repair alloy is melted and solidified on the damaged blade tip 50 to replace that lost during service and in the step 22. The weld repair is accomplished using the repair alloy having a composition that is different from that of the base metal that forms the body 41. The repair alloy is a nickel-base superalloy that is more resistant to oxidation than is the base metal in the operating environment of the gas turbine blade. The oxidation resistance is measured either in actual engine operations or in testing that simulates engine operations, such as burner rig testing.

A preferred repair alloy has a nominal composition, in weight percent, of from 7.4 to 7.8 percent chromium, from 5.3 to 5.6 percent tantalum, from 2.9 to 3.3 percent cobalt, from 7.6 to 8.0 percent aluminum, from 0.12 to 0.18 percent hafnium, from 0.5 to 0.6 percent silicon, from 3.7 to 4.0 percent tungsten, from 1.5 to 1.8 percent rhenium, from 0.01 to 0.03 percent carbon, from 0.01 to 0.02 percent boron, balance nickel. More preferably, the repair alloy has a nominal composition in weight percent of 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.10 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements total 0.5 percent maximum. If other repair alloys are used, they preferably have an oxidation resistance equal to or superior to the oxidation resistance of these alloys.

Techniques for performing the welding operation 24, other than the use of the repair alloy having the properties and compositions discussed herein, include gas tungsten arc, plasma transfer arc, and laser welding, and are known in the art. See, for example, U.S. Pat. No. 5,897,801, whose disclosure is incorporated by reference. The welding step 24 restores the dimensions of the gas turbine blade to those specified for the original gas turbine blade, prior to any service and/or damage. The welding step 24 typically is followed by a step 25 of restoring the required contour and shape of the gas turbine blade so that it meets the aerodynamic specifications. In step 25, excess weld material from step 24 is removed, and the tip portion of the gas turbine blade is shaped as necessary. The contour restoration 25 may be performed by any operable technique, such as electro-discharge machining, milling, hand benching, or grinding. If there are internal cooling passages in the turbine blade 40, the openings 48 are reopened as necessary by a technique such as laser or EDM drilling.

Figure 3:
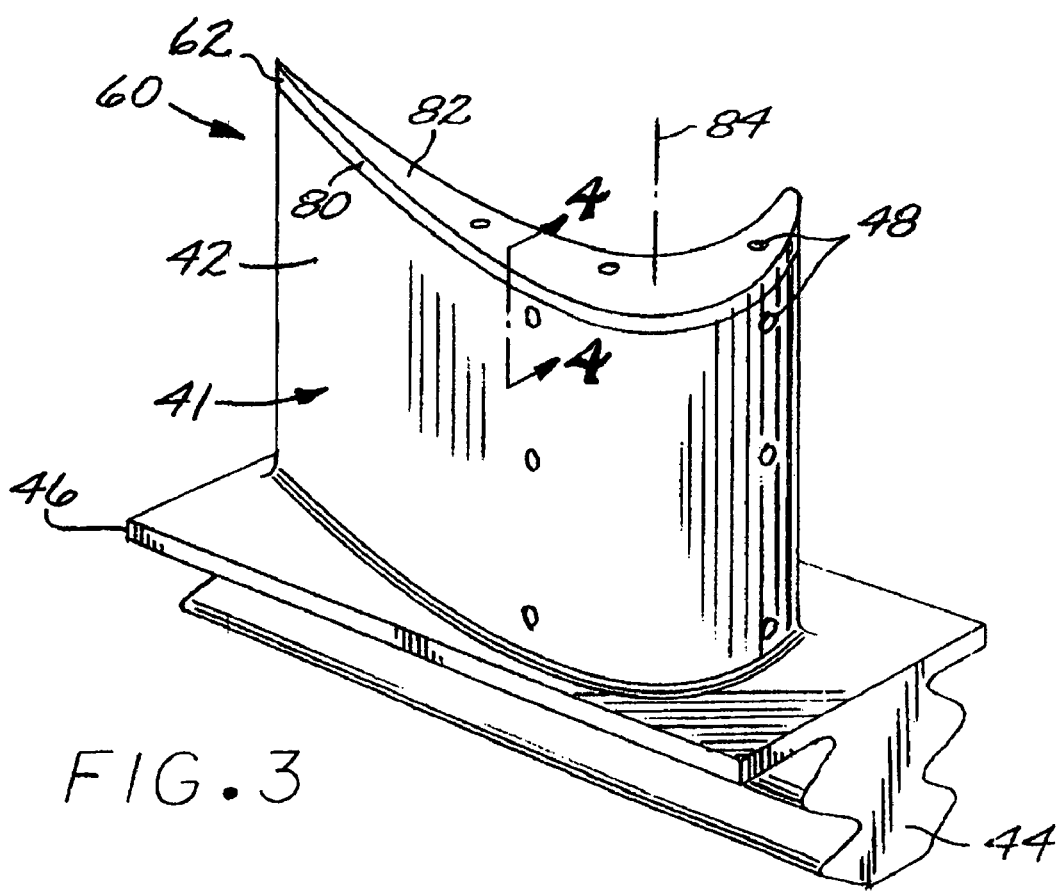
FIG. 3 is a perspective view of a tip-repaired gas turbine blade.

The welding step 24 and contouring step 25 produce a tip-repaired gas turbine blade 60, illustrated in FIG. 3. Common features with the damaged gas turbine blade 40 are assigned the same callout numbers as used in relation to FIG. 2, and the prior discussion is incorporated as to those common features. The body 41 of the tip-repaired gas turbine blade 60 is made of the base metal, and a repaired blade tip 62 is made of the repair metal.

The tip-repaired gas turbine blade 60 may optionally be heat treated, step 26, to relieve stresses produced in the welding step 24, and to age the microstructure. A typical stress-relief and age heat treatment 26 is performed in a temperature range of from 1850° F. to 2050° F. and for a time of from 1 hour to 8 hours, followed by a final ageing heat treatment at a temperature of from 1500° F. to 1700° F. and for a time of from 2 hours to 16 hours.

An important feature of the method of FIG. 1 is the steps that are not performed in the present method, as compared with prior methods. The method does not include any step of coating the lateral surface 80 of the repaired blade tip 62 with a non-ceramic coating after the step of weld repairing 24. (The lateral surface 80 of the repaired blade tip 62 is part of the surface of the airfoil 42 against which the hot combustion gas is directed, and is distinct from the end surface 82 that faces the stationary shroud. The lateral surface 80 is parallel to a long axis 84 of the turbine blade 60, while the end surface 82 is perpendicular to the long axis 84.) Such a non-ceramic coating would include, for example, an overlay or a diffusional environmental or bond coating. Such non-ceramic coatings are not required or used in the present approach because of the selection of the repair metal that is more oxidation resistant than the base metal. The application of such non-ceramic coatings is time consuming and adds significantly to the cost of the repair, and also requires a time-consuming, costly heat treatment. The application of non-ceramic coatings to the lateral surface of the blade tip is a standard feature of prior techniques, and such application is normally present in prior art coating procedures unless specifically stated to be absent.

FIG. 4 (which is not drawn to scale) illustrates the tip-repaired gas turbine blade 60 where no non-ceramic coating has been applied to the repaired blade tip 62. That is, the repaired blade tip 62 has no coating of any type thereon. A preexisting protective coating 64 is present on the body 41 of the tip-repaired gas turbine blade 60. The preexisting protective coating 64 on other parts of the tip-repaired gas turbine blade 60 is illustrated as having both a bond coat 66 and the ceramic thermal barrier coating 68. Neither the preexisting protective coating 64 nor any other coating extends to overlie the repaired blade tip 62.

Even though no non-ceramic coating is applied to the lateral surface 80 of the tip-repaired gas turbine blade 60, a ceramic thermal barrier coating 70 may optionally be applied overlying the lateral surface 80 of the repaired blade tip 62, step 28, as shown in FIG. 5 (which is not drawn to scale). The ceramic thermal barrier coating 70 is preferably the same material as the ceramic thermal barrier coating 68. Techniques for applying ceramic thermal barrier coatings 70 are known in the art, see for example U.S. Pat. No. 6,607,611, whose disclosure is incorporated by reference. No non-ceramic bond coat 66 or a similar non-ceramic bond coat is present between the repair metal of the repaired blade tip 62 and the ceramic thermal barrier coating 70. If such a ceramic thermal barrier coating is applied in optional step 28, it may be desirable to thereafter heat treat the resulting coated tip-repaired gas turbine blade 60, step 30. A typical stress-relief heat treatment 30 is performed at a temperature range of from 1850° F. to 2050° F. and for a time of from 1 hour to 8 hours, followed by a final ageing heat treatment at a temperature of from 1500° F. to 1700° F. and for a time of from 2 hours to 16 hours.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for repairing a damaged gas turbine blade, comprising the steps of
   furnishing the damaged gas turbine blade which has previously been in service and which is made of a base metal;
   removing any damaged material from a damaged blade tip of the damaged gas turbine blade; and
   weld repairing the damaged blade tip with a nickel-base superalloy repair alloy that is more resistant to oxidation than is the base metal in the operating environment of the gas turbine blade to form a tip-repaired gas turbine blade having a repaired blade tip, wherein the repair alloy has a composition different from the base metal, and wherein the method does not include any step of coating a lateral surface of the repaired blade tip with a non-ceramic coating after the step of weld repairing; and
   heat treating the tip-repaired gas turbine blade at a temperature from about 1850° F. to about 2050° F. and for a time of from about 1 hour to about 8 hours, followed by an ageing heat treatment at a temperature of from about 1500° F. to about 1700° F. and for a time of from about 2 hours to about 16 hours.

2. The method of claim 1, wherein the method does not include any step of coating the lateral surface of the repaired blade tip with a ceramic coating after the step of weld repairing.

3. The method of claim 1, including an additional step, after the step of weld repairing, of
   heat treating the tip-repaired gas turbine blade.

4. A method for repairing a damaged gas turbine blade, comprising the steps of:

furnishing the damaged gas turbine blade which has previously been in service and which is made of a base metal;

removing any damaged material from a damaged blade tip of the damaged gas turbine blade;

weld repairing the damaged blade tip with a nickel-base superalloy repair alloy that is more resistant to oxidation than is the base metal in the operating environment of the gas turbine blade to form a tip-repaired gas turbine blade having a repaired blade tip, wherein the repair alloy has a composition different from the base metal, and wherein the method does not include any step of coating a lateral surface of the repaired blade tip with a non-ceramic coating after the step of weld repairing; and weld repairing the damaged blade tip with a nickel-base superalloy repair alloy having an oxidation resistance in the operating environment of the gas turbine blade that is equal to or better than an alloy having a nominal composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel.

5. A method for repairing a damaged gas turbine blade, comprising the steps of furnishing the damaged gas turbine blade made of a base metal and which has previously been in service;

removing any damaged material from a damaged blade tip of the damaged gas turbine blade; and weld repairing the damaged blade tip with a repair alloy having a nominal composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel to form a tip-repaired gas turbine blade having a repaired blade tip, wherein the repair alloy has a composition different from the base metal, and wherein the method does not include any step of coating a lateral surface of the repaired blade tip with a non-ceramic coating after the step of weld repairing.

6. The method of claim 5, wherein the step of weld repairing includes the step of welding repairing the damaged blade tip with the repair alloy having a nominal composition in weight percent of 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.10 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements total 0.5 percent maximum to form a tip-repaired gas turbine blade.

7. The method of claim 5, wherein the method does not include any step of coating the lateral surface of the repaired blade tip with a ceramic coating after the step of weld repairing.

8. The method of claim 5, including an additional step, after the step of weld repairing, of heat treating the tip-repaired gas turbine blade.

9. The method of claim 5, including an additional step, after the step of weld repairing, of heat treating the tip-repaired gas turbine blade at a temperature from about 1850° F. to about 2050° F. and for a time of from about 1 hour to about 8 hours, followed by an ageing heat treatment at a temperature of from about 1500° F. to about 1700° F. and for a time of from about 2 hours to about 16 hours.

* * * * *